US012284683B2

(12) United States Patent
Tripathi

(10) Patent No.: US 12,284,683 B2
(45) Date of Patent: Apr. 22, 2025

(54) SYSTEM AND METHODS FOR ADAPTIVE RANDOM ACCESS RESPONSE OPTIMIZATION

(71) Applicant: RAKUTEN MOBILE, INC., Tokyo (JP)

(72) Inventor: Sandeep Mani Tripathi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/796,192

(22) PCT Filed: Jun. 30, 2022

(86) PCT No.: PCT/US2022/035648
§ 371 (c)(1),
(2) Date: Jul. 28, 2022

(87) PCT Pub. No.: WO2024/005815
PCT Pub. Date: Jan. 4, 2024

(65) Prior Publication Data
US 2024/0188138 A1 Jun. 6, 2024

(51) Int. Cl.
H04W 74/0833 (2024.01)
H04L 47/38 (2022.01)

(52) U.S. Cl.
CPC ......... H04W 74/0833 (2013.01); H04L 47/38 (2013.01)

(58) Field of Classification Search
CPC . H04W 74/0833; H04W 76/18; H04W 28/02; H04L 47/38
See application file for complete search history.

(56) References Cited

U.S. PATENT DOCUMENTS 10,797,846 B2 * 10/2020 Bai ............... H04W 68/02
11,432,359 B1 * 8/2022 Marupaduga ..... H04W 72/1263
2018/0255587 A1 * 9/2018 Shailendra ........ H04W 72/0446

OTHER PUBLICATIONS

International Search Report dated Sep. 28, 2022 in Application No. PCT/US22/35648.
Written Opinion of the International Searching Authority dated Sep. 28, 2022 in Application No. PCT/US22/35648.

* cited by examiner

Primary Examiner — Kwang B Yao
Assistant Examiner — Patrick Yipao Pei
(74) Attorney, Agent, or Firm — Sughrue Mion, PLLC

(57) ABSTRACT

A method for adaptively optimizing a random access response (RAR) message by a radio access network (RAN) node includes: determining a first number of connection attempts over a first time duration that are received from one or more user equipment (UE); determining a success rate for the first number of connection attempts; updating one or more parameters to adjust a code rate used for generating communication messages to the one or more UEs, from a first code rate to a second code rate, based at least in part on the success rate; generating the RAR message using the second code rate, in response to receiving an initial access connection request message from a first UE among the one or more UEs; sending the RAR message based at least in part on the second code rate to the first UE.

14 Claims, 5 Drawing Sheets

SYSTEM AND METHODS FOR ADAPTIVE RANDOM ACCESS RESPONSE OPTIMIZATION

CROSS REFERENCE TO RELATED APPLICATIONS

This application is a National Stage of International Application No. PCT/US2022/035648 filed Jun. 30, 2022.

1. Field

Apparatuses and methods consistent with example embodiments of the present disclosure relate to adaptively optimizing a random access response (RAR) message by a radio access network (RAN) node.

2. Description of Related Art

In related art telecommunications standards (e.g., 3GPP specifications for LTE, 5G, etc.), in order for a user equipment (UE) to acquire uplink synchronization and obtain a specified ID for radio access communication, an initial access sequence is performed between the UE and a radio access network (RAN) node (e.g., gNB). The initial access sequence typically involves a UE transmitting a first message (e.g., random access channel (RACH) message) to the node. In response to receiving the first message from the UE, the node may send a second message (e.g., RAR message) using a predetermined code rate. The node may use a modulation and coding scheme (MCS) and a number of physical resource blocks (PRBs) corresponding to the predetermined code rate when sending the RAR message to the UE. However, even if a radio frequency condition of an environment may support a higher code rate, or if the radio frequency condition of the environment may only support a lower code rate, the code rate used by the node for the RAR message remains the same.

SUMMARY

According to embodiments, systems and methods are provided for a system to enable adaptively varying a code rate based on cell statistics over a period of time.

According to aspects of one or more example embodiments, a method for adaptively optimizing a random access response (RAR) message by a radio access network (RAN) node includes: determining a first number of connection attempts over a first time duration that are received from one or more user equipment (UE); determining a success rate for the first number of connection attempts; updating one or more parameters to adjust a code rate used for generating communication messages to the one or more UEs, from a first code rate to a second code rate, based at least in part on the success rate; generating the RAR message using the second code rate, in response to receiving an initial access connection request message from a first UE among the one or more UEs; sending the RAR message based at least in part on the second code rate to the first UE.

Determining the first number of connection attempts over the first duration that are received from the one or more UE may include: receiving one or more first messages from the one or more UE, each first message indicating an initial access connection request by a corresponding UE; generating one or more second messages using the first code rate, each second message indicating a random access response to the initial access connection request by the corresponding UE; sending the one or more second messages to the one or more UE over the first time duration; and determining the first number of connection attempts to be a number of the one or more second messages sent to the one or more UE over the first time duration.

Determining the success rate for the first number of connection attempts may include: receiving one or more third messages from the one or more UE indicating receipt of one or more second messages sent to the one or more UE over the first time duration, each third message indicating receipt by a corresponding UE in response to a corresponding second message sent to the corresponding UE; and determining the success rate for the first number of connection attempts based at least in part on a number of second messages sent over the first time duration and a number of third messages received.

The one or more second messages may be generated using the first code rate. The success rate may be a ratio of the number of third messages received and the number of second messages sent over the first time duration.

The updating one or more parameters to adjust the code rate used for generating the communication messages to the one or more UE, from the first code rate to the second code rate, based at least in part on the success rate, may include: determining the second code rate to be less than the first code rate, in response to determining that the first number of connection attempts is greater than a first connection attempt threshold and that the success rate is less than a first success rate threshold; and updating the one or more parameters to decrease the code rate in response to determining the first code rate is greater than a minimum code rate threshold.

The updating one or more parameters to adjust the code rate used for generating the communication messages to the one or more UE, from the first code rate to the second code rate, based at least in part on the success rate, may include: determining the second code rate to be greater than the first code rate, in response to determining that the first number of connection attempts is greater than a second connection attempt threshold and the success rate is greater than a second success rate threshold; and updating the one or more parameters to increase the code rate in response to determining the first code rate is less than a maximum code rate threshold.

The first message may be a random access channel (RACH) message, the second message may be a RAR message, and the third message may be a radio resource control (RRC) message.

According to aspects of one or more example embodiments, an apparatus for performing adaptive optimization of a RAR message by a RAN node includes: a memory storing instructions; and at least one processor configured to execute the instructions to: determining a first number of connection attempts over a first time duration that are received from one or more UE; determining a success rate for the first number of connection attempts; updating one or more parameters to adjust a code rate, used for generating communication messages to the one or more UEs, from a first code rate to a second code rate, based at least in part on the success rate; generating the RAR message using the second code rate, in response to receiving an initial access connection request message from a first UE among the one or more UEs; and sending the RAR message based at least in part on the second code rate to the first UE.

Determining, by the apparatus, the first number of connection attempts over the first duration that are received from the one or more UE may include: receiving one or more first messages from the one or more UE, each first message indicating an initial access connection request by a corresponding UE; generating one or more second messages using the first code rate, each second message indicating a random access response to the initial access connection request by the corresponding UE; sending the one or more second messages to the one or more UE over the first time duration; and determining the first number of connection attempts to be a number of the one or more second messages sent to the one or more UE over the first time duration.

Determining, by the apparatus, the success rate for the first number of connection attempts may include: receiving one or more third messages from the one or more UE indicating receipt of one or more second messages sent to the one or more UE over the first time duration, each third message indicating receipt by a corresponding UE in response to a corresponding second message sent to the corresponding UE; and determining the success rate for the first number of connection attempts based at least in part on a number of second messages sent over the first time duration and a number of third messages received.

The one or more second messages may be generated, by the apparatus, using the first code rate. The success rate may be a ratio of the number of third messages received and the number of second messages sent over the first time duration.

The updating, by the apparatus, one or more parameters to adjust the code rate used for generating the communication messages to the one or more UE, from the first code rate to the second code rate, based at least in part on the success rate, may include: determining the second code rate to be less than the first code rate, in response to determining that the first number of connection attempts is greater than a first connection attempt threshold and that the success rate is less than a first success rate threshold; and updating the one or more parameters to decrease the code rate in response to determining the first code rate is greater than a minimum code rate threshold.

The updating, by the apparatus, one or more parameters to adjust the code rate used for generating the communication messages to the one or more UE, from the first code rate to the second code rate, based at least in part on the success rate, may include: determining the second code rate to be greater than the first code rate, in response to determining that the first number of connection attempts is greater than a second connection attempt threshold and the success rate is greater than a second success rate threshold; and updating the one or more parameters to increase the code rate in response to determining the first code rate is less than a maximum code rate threshold.

According to aspects of one or more example embodiments, a non-transitory computer-readable medium for storing computer readable program code or instructions for carrying out operations, when executed by a processor, for adaptive optimization of a random access response (RAR) message includes: determining a first number of connection attempts over a first time duration that are received from one or more user equipment (UE); determining a success rate for the first number of connection attempts; updating one or more parameters to adjust a code rate used for generating communication messages to the one or more UEs, from a first code rate to a second code rate, based at least in part on the success rate; generating the RAR message using the second code rate, in response to receiving an initial access connection request message from a first UE among the one or more UEs; and sending the RAR message based at least in part on the second code rate to the first UE.

The operation of determining the first number of connection attempts over the first duration that are received from the one or more UE may include: receiving one or more first messages from the one or more UE, each first message indicating an initial access connection request by a corresponding UE; generating one or more second messages using the first code rate, each second message indicating a random access response to the initial access connection request by the corresponding UE; sending the one or more second messages to the one or more UE over the first time duration; and determining the first number of connection attempts to be a number of the one or more second messages sent to the one or more UE over the first time duration.

The operation of determining the success rate for the first number of connection attempts may include: receiving one or more third messages from the one or more UE indicating receipt of one or more second messages sent to the one or more UE over the first time duration, each third message indicating receipt by a corresponding UE in response to a corresponding second message sent to the corresponding UE; and determining the success rate for the first number of connection attempts based at least in part on a number of second messages sent over the first time duration and a number of third messages received.

The one or more second messages may be generated using the first code rate. The success rate may be a ratio of the number of third messages received and the number of second messages sent over the first time duration.

The operation of updating one or more parameters to adjust the code rate used for generating the communication messages to the one or more UE, from the first code rate to the second code rate, based at least in part on the success rate, may include: determining the second code rate to be less than the first code rate, in response to determining that the first number of connection attempts is greater than a first connection attempt threshold and that the success rate is less than a first success rate threshold; and updating the one or more parameters to decrease the code rate in response to determining the first code rate is greater than a minimum code rate threshold.

The operation of updating one or more parameters to adjust the code rate used for generating the communication messages to the one or more UE, from the first code rate to the second code rate, based at least in part on the success rate, may include: determining the second code rate to be greater than the first code rate, in response to determining that the first number of connection attempts is greater than a second connection attempt threshold and the success rate is greater than a second success rate threshold; and updating the one or more parameters to increase the code rate in response to determining the first code rate is less than a maximum code rate threshold.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
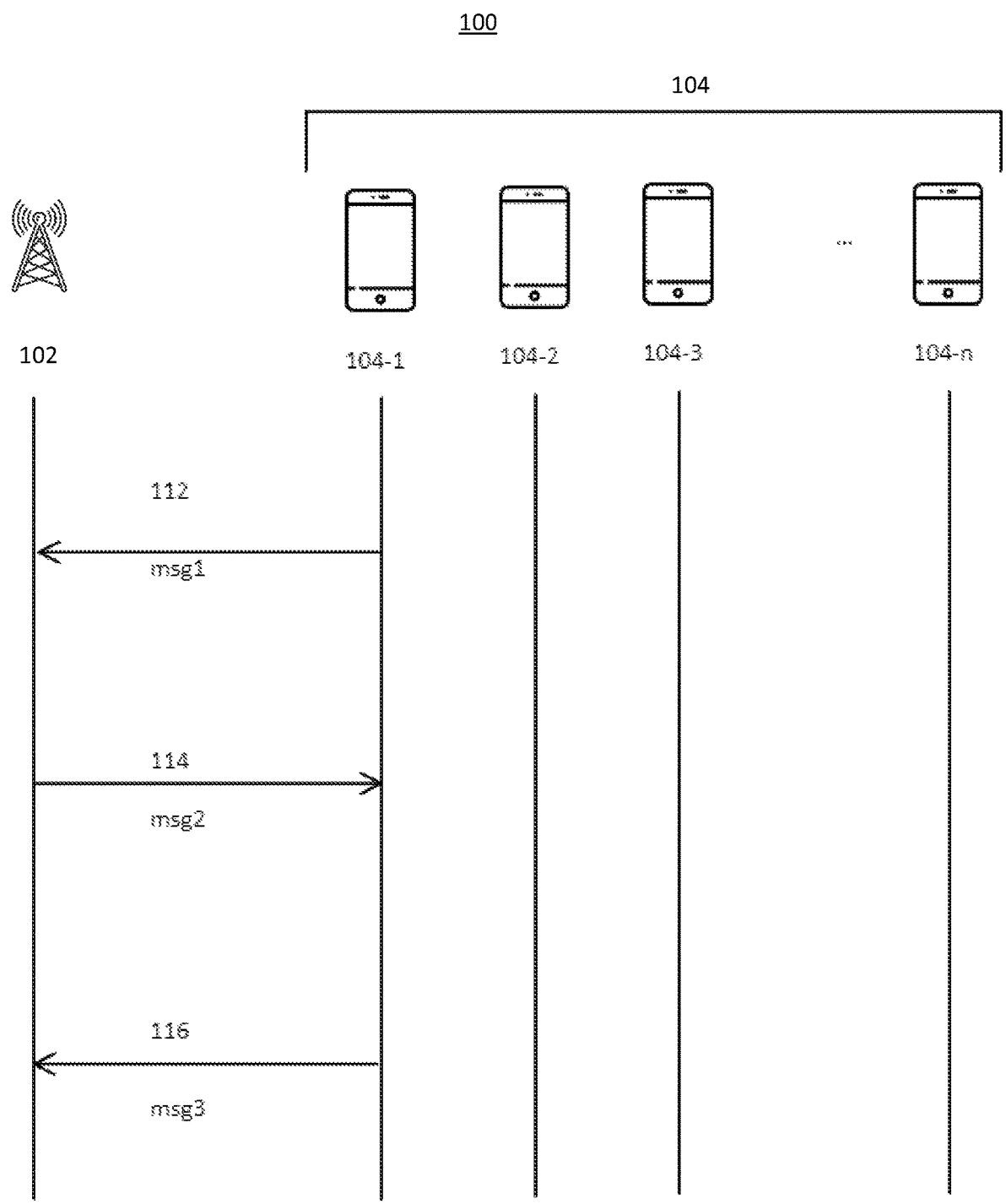
FIG. 1 illustrates an initial access procedure between a base station and a user equipment (UE), in accordance with one or more example embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, the related art initial access procedure relies on static parameters to determine specify a code rate in a random access response (RAR) message for communication between a base station and a user equipment (UE). However, even if a radio frequency condition of an environment may support a higher code rate, or if the radio frequency condition may only support a lower code rate, the code rate determined by the base station for the second message remains the same.

Example embodiments provide a system and method that adaptively optimize a RAR message. For instance, a radio access network (RAN) node (e.g., gNB) may determine a success rate for initial access attempts from a plurality of UE, and update one or more parameters used to determine a code rate for a RAR message. The node may determine a radio frequency condition of an environment between the base station and a UE based on the success rate. If the success rate is high then the radio frequency condition is good and may support a higher code rate, so the node may update the one or more parameters to increase the code rate. If the success rate is low then the radio frequency condition is poor and may support a lower code rate, so the node may update the one or more parameters to decrease the code rate.

FIG. 1 illustrates an initial access procedure between a RAN node and a UE, in accordance with one or more example embodiments. Referring to FIG. 1, a radio access network node 102 (e.g., gNB) and UE(s) 104 may operate in an environment 100. The UE(s) 104 may include one or more user equipment, such as, UE 104-1, UE 104-2, UE 104-3, etc. To start the initial access procedure, a UE (e.g., UE 104-1) may send a first message 112 ("msg1") to the node 102. For example, the UE 104-1 may send a random access channel (RACH) message as the first message 112. The first message 112 may include a random access preamble selected by the UE 104-1.

In response to receiving the first message 112 from the UE 104-1, the node 102 may generate a second message 114 ("msg2") and send the second message 114 to the UE 104-1. For example, the node 102 may generate a random access response (RAR) message as the second message 114. The node 102 may determine a code rate to use for the second message 114 and may send the second message 114 to the UE 114-1 using a modulation and coding scheme (MCS) and a number of physical resource blocks (PRBs) corresponding to the determined code rate.

In response to receiving the second message 114 from the node 102, the UE 104-1 may send a third message 116 ("msg3") to the base station. For example, the UE 104-1 may send a radio resource control (RRC) message as the third message 116. The third message 116 may indicate an acknowledgment that the UE 104-1 received the second message 114.

In response to receiving the third message 116 from the UE 104-1, the node 102 may determine that the initial access procedure with the UE 104-1 was successful. If the node 102 does not receive the third message 116 from the UE 104-1, then the node 102 may determine that the initial access procedure with the UE 104-1 was unsuccessful. In an alternative example embodiment, the node 102 may determine if the third message 116 was received from the UE 104-1 within a specified time window. For example, if the node 102 determines that the third message 116 was received from the UE 104-1 within the specified time window from when the second message 114 was sent by the node 102, then the node 102 may determine that the initial access procedure with the UE 104-1 was successful. If the node 102 determines that the third message 116 was received from the UE 104-1 outside the specified time window from when the second message 114 was sent by the node 102, then the node 102 may determine that the initial access procedure with the UE 104-1 was unsuccessful.

The node 102 may perform the initial access procedure with each one or more UE(s) 104 from which the node 102 receives a first message 112. For example, if the node 102 receives a first message 112 from the UE 104-2, then the node 102 may perform the initial access procedure with the UE 104-2. As another example, if the node 102 receives a first message 112 from the UE 104-3, then the node 102 may perform the initial access procedure with the UE 104-3.

Figure 2:
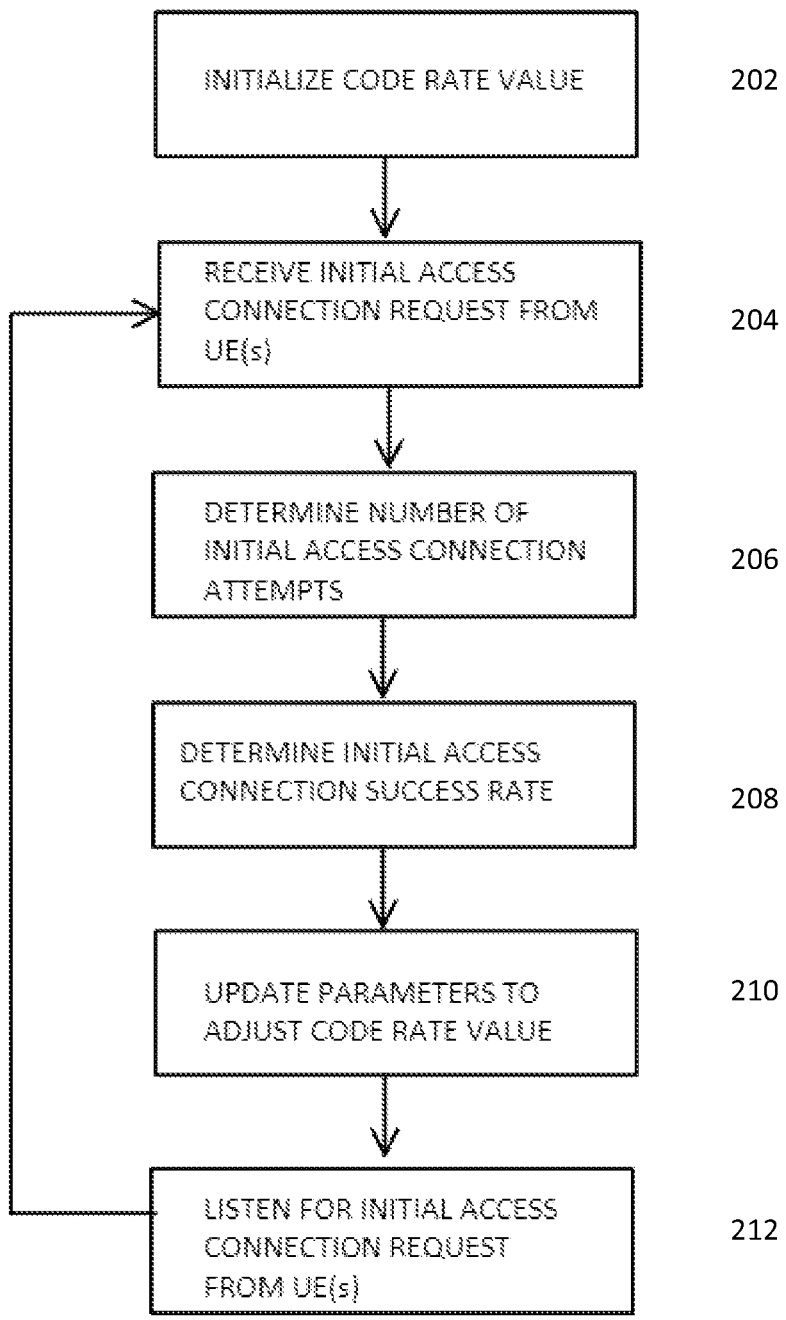
FIG. 2 illustrates a flowchart of a method for performing adaptive optimization of a radio access response (RAR) message, in accordance with one or more example embodiments.

FIG. 2 illustrates a flowchart of a method for performing adaptive optimization of a radio access response (RAR) message, in accordance with one or more example embodiments. Referring to FIG. 2, at operation 202, the node 102 may initialize a code rate value to be used by the node 102. The node 102 may initialize the code rate based on one or more predetermined static parameters. For example, the node 102 may initialize the code rate based on a predetermined value set by a network administrator.

At operation 204, the node 102 may receive a first messages 112 from each of one or more UE(s) 104 (e.g., UE 104-1 and UE 104-2). For example, the node 102 may receive a first message 112 from UE 104-1 and a first message 112 from UE 104-2. In response, the node 102 may perform an initial access procedure with each of the UE 104-1 and 104-2.

At operation 206, the node 102 may determine a number of initial access connection attempts. For example, in response to receiving the first message 112 from the UE 104-1, the node 102 may generate a second message 114 associated with UE 104-1 and send the second message 114 associated with UE 104-1 to the UE 104-1; and in response to receiving the first message 112 from the UE 104-2, the node 102 may generate a second message 114 associated with the UE 104-2 and send the second message 114 associated with the UE 104-2 to the UE 104-2. After sending each second messages 114 to a respective UE among the UE(s) 104, the node 102 may update a value stored in memory that represents a number of initial access connection attempts. For example, after sending the second message 114 to the UE 104-1, the node 102 may increment the number of connection attempts by one, and after sending the second message 114 to the UE 104-2, the node 102 may increment the number of connection attempts by one.

At operation 208, the node 102 may determine an initial access connection success rate. For example, in response to the UE 104-1 receiving the second message 114 from the node 102, the UE 104-1 may send a third message 116 associated with the UE 104-1 to the node 102, and in response to the UE 104-2 receiving the second message 114 from the node 102, the UE 104-2 may send a third message 116 associated with the UE 104-2 to the node 102. In response to receiving the third messages 116 from each respective UE among the UE(s) 104, the node 102 may update a value stored in memory that represents a number of successful initial access connections. For example, if the node 102 receives the third message 116 from the UE 104-2, then the node 102 may increment the number of successful connections by one, and if the node 102 receives the third message 116 from the UE 104-3, then the node 102 may increment the number of successful connections by one. If the node 102 does not receive the third message 116 from the UE 104-1 or UE 104-2, then the node 102 does not increment the number of successful initial access connections. The node 102 may determine the initial access connection success rate based at least in part of a ratio of the number of successful initial access connections and the number of initial access connection attempts. In some embodiments, the node 102 may determine if the third message 116 from the respective UE among the UE(s) 104 is received within a time window, and the node 102 may determine the initial access connection success rate based at least in part on whether the third message 116 is received within the time window. For example, the node 102 may start a time window when sending the second message 114 to the UE 104-1, and determine if the third message 116 from the UE 104-1 is received within the time window. If the node 102 receives the third message 116 from the UE 104-1 within the time window, then the node 102 may increment the number of successful connections by one. If the node 102 does not receive the third message 106 from the UE 104-1, or if the node 102 receives the third message 106 from the UE 104-1 outside of the time window, then the node 102 does not increment the number of successful connections.

At operation 210, the node 102 may update one or more parameters to adjust the code rate for communication with the UE(s) 104. For example, the node 102 may determine if the initial access connection success rate is above or below a threshold value. If the success rate is below the threshold value, then the node 102 may adjust the parameters to decrease the code rate; and if the success rate is above the threshold value, then the node 102 may adjust the parameters to increase the code rate. For example, the node 102 may decrease the code rate based at least in part on a code rate decrease threshold value indicating a number of steps to decrease the code rate. As another example, the node 102 may increase the code rate based at least in part on a code rate increase threshold value indicating a number of steps to increase the code rate.

In some implementations, the node 102 may determine one or more of whether a minimum number of connection attempts is met, a minimum number of connection attempts over a specified time duration is met, a code rate being used is below a minimum code rate, and the code rate is above a maximum code rate. The node 102 may update the one or more parameters to adjust the code rate based at least in part on the determination, as discussed further below.

At operation 212, the node 102 may listen for a first message 112 sent from one or more of the UE(s) 104. For example, the UE 104-3 may send a first message 112. If the node 102 detects the first message 112, then the node 102 may return to operation 204. At operation 204, the node 102 may receive the first message 112 from the UE 104-3. At operation 206, the node 102 may generate a second message 114 associated with the UE 104-3, using the code rate adjusted by the node 102 at operation 210. The node 102 may send the second message 114 associated with the UE 104-3 to the UE 104-3, and increment the number of connection attempts by one. At operation 208, the node 102 may receive a third message 116 from the UE 104-3, and increment the number of successful connections by one. The node 102 may determine the initial access connection success rate based at least in part on the recently updated number of connection attempts and recently updated number of successful connections. Alternatively, at operation 208, the node 102 may receive the third message 116 from the UE 104-3 outside of a time window associated with sending the second message 114 to the UE 104-3, and the node 102 does not increment the number of successful connections by one. The node 102 may determine the initial access connection success rate based at least in part on the recently updated number of connection attempts and the same as previous number of successful connections. At operation 210, the node 102 may update one or more parameters to adjust the code rate, based at least in part on the updated initial access connection success rate. At operation 212, the node 102 may listen for a first message 112 sent from one or more of the UE(s) 104. After the initialization is performed, the process illustrated in FIG. 2 may be performed continuously for a predetermined amount of time, a predetermined number of iterations, at a predetermined interval, based on a triggering event, etc.

It is understood that, in various embodiments, one or more of the operations in FIG. 2 may be omitted, and/or one or more additional or different operations may be added.

Figure 3:
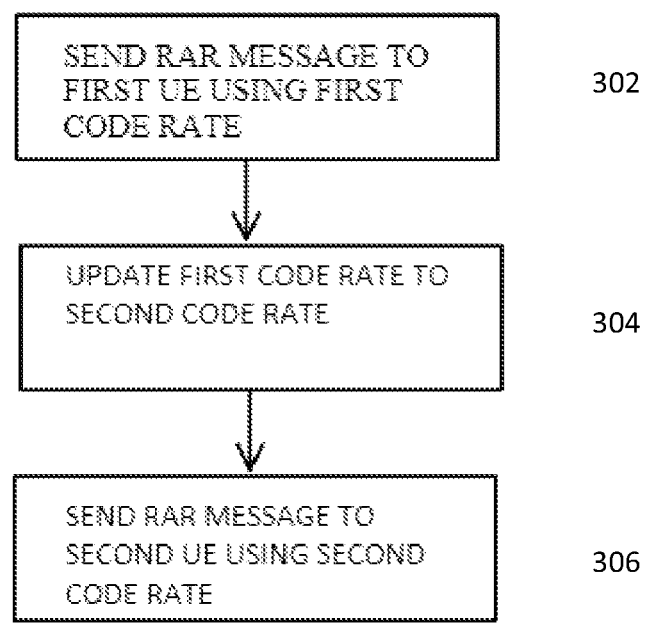
FIG. 3 illustrates a flowchart of a method for performing adaptive optimization of a radio access response (RAR) message, in accordance with one or more example embodiments.

FIG. 3 illustrates a flowchart of a method for performing adaptive optimization of a radio access response (RAR) message, in accordance with one or more example embodiments. Referring to FIG. 3, at operation 302, the node 102 may send a RAR message to a first UE using a first code rate, in response to receiving a RACH message from the first UE. At operation 304, the node 102 may update one or more parameters to adjust the code rate from the first code rate to a second code rate, based at least in part on a success rate. For example, if the node 102 receives a RRC message from the first UE, and the success rate increases, then the node 102 may increase the code rate. If the node does not receive the RRC message from the first UE, and the success rate decreases, then the node 102 may decrease the code rate. At operation 306, the node 102 may send a RAR message to a second UE using the second code rate, in response to receiving a RACH message from the second UE.

It is understood that, in various embodiments, one or more of the operations in FIG. 3 may be omitted, and/or one or more additional or different operations may be added.

Figure 4:
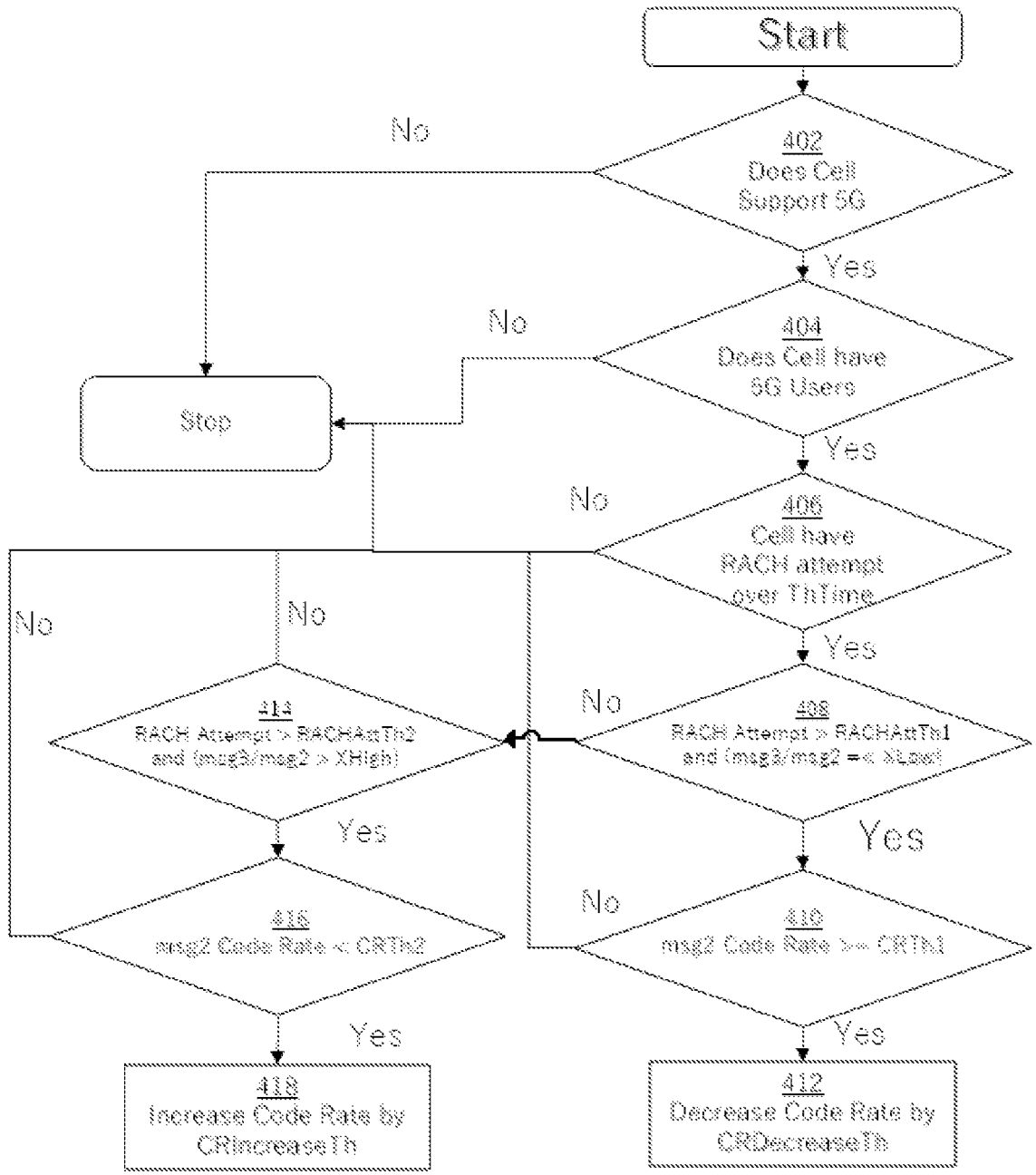
FIG. 4 illustrates a flowchart of a method for adjusting a code rate, in accordance with one or more example embodiments.

FIG. 4 illustrates a flowchart of a method for adjusting a code rate, in accordance with one or more example embodiments. Referring to FIG. 4, at operation 402, the node 102 may determine if it services a cell supporting 5G. If the node 102 determines that the cell does not support 5G, then the node 202 proceeds to stop. If the node 102 determines that the cell supports 5G, then the node 202 proceeds to operation 404.

At operation 404, the node 102 may determine if the cell includes one or more UE(s) 104 that supports 5G. If the node 102 determines that the cell does not include UE(s) 104 that support 5G, then the node 102 proceeds to stop. If the node 102 determines that the cell includes UE(s) 104 that support 5G, then the node 102 proceeds to operation 406.

At operation 406, the node 102 may determine if the node 102 has received one or more initial access connection request messages (e.g., first message 112, RACH message) over a threshold time duration ThTime. If the node 102 determines that no initial access connection request messages were received over ThTime, then the node 102 proceeds to stop. If the node 102 determines that an initial access connection request message was received from one of the UE(s) 104, then the node 102 proceeds to operation 408.

At operation 408, the node 102 may determine if the number of initial access connection request messages received is greater than a first threshold value RACHAttTh1, and if an initial access connection success rate corresponding to the cell is less than or equal to a minimum success rate Xlow. If the node 102 determines that the number of initial access connection request messages received is less than or equal to RACHAttTh1 or if the initial access connection success rate is greater than Xlow, then the node 102 proceeds to operation 414. If the node 102 determines that the number of initial access connection request messages received is greater than RACHAttTh1 and the initial access connection success rate is less than or equal to Xlow, then the node 102 proceeds to operation 410.

At operation 410, the node 102 may determine if a current code rate being used by the node 102 is greater than or equal to a minimum code rate CRTh1. If the node 102 determines that the current code rate being used is less than CRTh1, then the node 102 proceeds to stop. In some implementations, if the node determines that the current code rate being used is less than CRTh1, then the node 102 may proceed to operation 406. If the node 102 determines that the current code rate being used is greater than or equal to CRTh1, then the node 102 proceeds to operation 412.

At operation 412, the node 102 may decrease the current code rate by a code rate decrease threshold CRDecreaseTh. The node 102 may use the new code rate (current code rate minus CRDecreaseTh) in subsequent RAR messages sent to one or more of the UE(s) 104.

At operation 414, the node 102 may determine if the number of initial access connection request messages received is greater than a second threshold value RACHAttTh2, and if an initial access connection success rate corresponding to the cell is greater than a maximum success rate Xhigh. If the node 102 determines that the number of initial access connection request messages received is less than RACHAttTh2, or if the initial access connection success rate is less than or equal to Xhigh, then the node 102 proceeds to stop. If the node 102 determines that the number of initial access connection request messages received is greater than or equal to RACHAttTh2 and the initial access connection success rate is greater than Xhigh, then the node 102 proceeds to operation 416.

At operation 416, the node 102 may determine if the current code rate being used by the node 102 is less than a maximum code rate CRTh2. If the node 102 determines that the current code rate being used is greater than or equal to CRTh2, then the node 102 proceeds to stop. In some implementations, if the node 102 determines that the current code rate being used is greater than or equal to CRTh2, then the node 102 may proceed to operation 406. If the node 102 determines that the current code rate being used is less than CRTh2, then the node 102 proceeds to operation 418.

At operation 418, the node 102 may increase the current code rate by a code rate increase threshold CRIncreaseTh. The node 102 may use the new code rate (current code rate plus CRIncreaseTh) in subsequent RAR messages sent to one or more of the UE(s) 104.

It is understood that, in various embodiments, one or more of the operations in FIG. 4 may be omitted, and/or one or more additional or different operations may be added.

Figure 5:
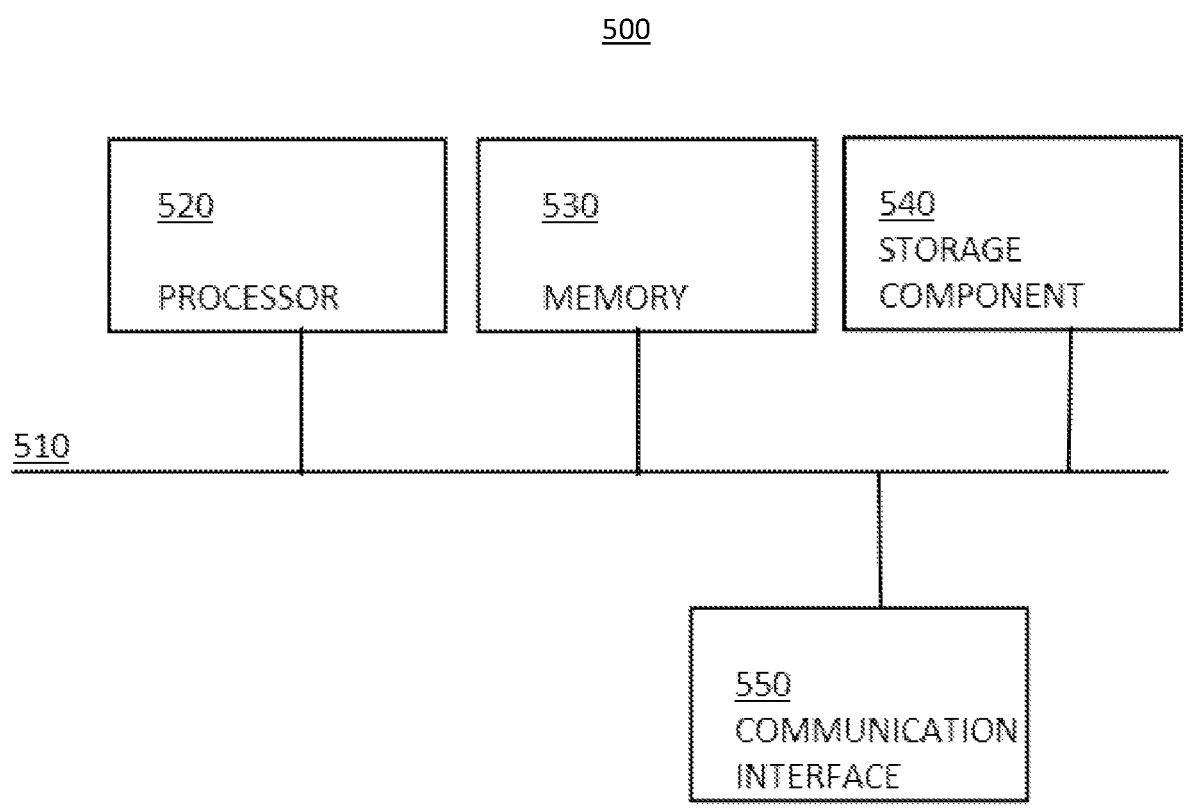
FIG. 5 illustrates a diagram of components of one or more devices, in accordance with one or more example embodiments.

FIG. 5 is a diagram of components of one or more devices according to an example embodiment. Device 500 may correspond to any of the devices described above (e.g., UE, base station, RAN node, core network device implementing core network function).

Referring to FIG. 5, the device 500 may include a bus 510, a processor 520, a memory 530, a storage component 540, and a communication interface 550. It is understood that one or more of the components may be omitted and/or one or more additional components may be included.

The bus 510 includes a component that permits communication among the components of the device 500. The processor 520 is implemented in hardware, firmware, or a combination of hardware and software. The processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 520 includes one or more processors capable of being programmed to perform a function.

The memory 530 includes a random access memory (RAM), a read only memory (ROM), and/or another type of dynamic or static storage device (e.g., a flash memory, a magnetic memory, and/or an optical memory) that stores information and/or instructions for use by the processor 520.

The storage component 540 stores information and/or software related to the operation and use of the device 500. For example, the storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 550 includes a transceiver-like component (e.g., a transceiver and/or a separate receiver and transmitter) that enables the device 900 to communicate with other devices, such as via a wired connection, a wireless connection, or a combination of wired and wireless connections. The communication interface 550 may permit device 500 to receive information from another device and/or provide information to another device. For example, the communication interface 550 may include an Ethernet interface, an optical interface, a coaxial interface, an infrared interface, a radio frequency (RF) interface, a universal serial bus (USB) interface, a Wi-Fi interface, a cellular network interface, or the like.

The device 500 may perform one or more processes or functions described herein. The device 500 may perform operations based on the processor 520 executing software instructions stored by a non-transitory computer-readable medium, such as the memory 530 and/or the storage component 540. A computer-readable medium is defined herein as a non-transitory memory device. A memory device includes memory space within a single physical storage device or memory space spread across multiple physical storage devices.

Software instructions may be read into the memory 530 and/or the storage component 540 from another computer-readable medium or from another device via the communication interface 550. When executed, software instructions stored in the memory 530 and/or storage component 540 may cause the processor 520 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 2-4 may be implemented by or using any one of the elements illustrated in FIGS. 1 and 5.

According to example embodiments, RAN node may adaptively optimize a RAR message. For instance, the node may determine a success rate for initial access attempts from a plurality of UE, and update one or more parameters used to determine a code rate for a RAR message. The node may update the one or more parameters to adjust the code rate based at least in part on a radio frequency condition of an environment between the node and a UE, a minimum number of connection attempts, a minimum number of connection attempts over a specified time duration, a minimum code rate, a maximum code rate, a code rate increase threshold, a code rate decrease threshold, and a threshold time duration. The node may adjust the code rate used for RAR messages as the radio frequency condition of the environment changes over time. As a result, resources used for communication between the node and a UE may be utilized with greater efficiency and less waste.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for adaptively optimizing a random access response (RAR) message by a radio access network (RAN) node, the method comprising:
   determining a first number of connection attempts over a first time duration that are received from one or more user equipment (UE);
   determining a success rate for the first number of connection attempts;
   updating one or more parameters to adjust a code rate used for generating communication messages to the one or more UEs, from a first code rate to a second code rate, based at least in part on the success rate;
   generating the RAR message using the second code rate, in response to receiving an initial access connection request message from a first UE among the one or more UEs; and
   sending the RAR message based at least in part on the second code rate to the first UE,
   wherein the updating one or more parameters to adjust the code rate used for generating the communication messages to the one or more UE, from the first code rate to the second code rate, based at least in part on the success rate, comprises:
   determining the second code rate to be less than the first code rate, in response to determining that the first number of connection attempts is greater than a first connection attempt threshold and that the success rate is less than a first success rate threshold, and updating the one or more parameters to decrease the code rate in response to determining the first code rate is greater than a minimum code rate threshold; or
   determining the second code rate to be greater than the first code rate, in response to determining that the first number of connection attempts is greater than a second connection attempt threshold and the success rate is greater than a second success rate threshold, and updating the one or more parameters to increase the code rate in response to determining the first code rate is less than a maximum code rate threshold.

2. The method of claim 1, wherein the determining the first number of connection attempts over the first duration that are received from the one or more UE comprises:
  receiving one or more first messages from the one or more UE, each first message indicating an initial access connection request by a corresponding UE;
  generating one or more second messages using the first code rate, each second message indicating a random access response to the initial access connection request by the corresponding UE;
  sending the one or more second messages to the one or more UE over the first time duration; and
  determining the first number of connection attempts to be a number of the one or more second messages sent to the one or more UE over the first time duration.

3. The method of claim 1, wherein the determining the success rate for the first number of connection attempts comprises:
  receiving one or more third messages from the one or more UE indicating receipt of one or more second messages sent to the one or more UE over the first time duration, each third message indicating receipt by a corresponding UE in response to a corresponding second message sent to the corresponding UE; and
  determining the success rate for the first number of connection attempts based at least in part on a number of second messages sent over the first time duration and a number of third messages received.

4. The method of claim 3, wherein the one or more second messages are generated using the first code rate, and wherein the success rate is a ratio of the number of third messages received and the number of second messages sent over the first time duration.

5. The method of claim 1, wherein the first message is a random access channel (RACH) message, the second message is a RAR message, and the third message is a radio resource control (RRC) message.

6. An apparatus for performing adaptive optimization of a random access response (RAR) message by a radio access network (RAN) node, the apparatus comprising:
  a memory storing instructions; and
  at least one processor configured to execute the instructions to:
    determining a first number of connection attempts over a first time duration that are received from one or more user equipment (UE);
    determining a success rate for the first number of connection attempts;
    updating one or more parameters to adjust a code rate, used for generating communication messages to the one or more UEs, from a first code rate to a second code rate, based at least in part on the success rate;
    generating the RAR message using the second code rate, in response to receiving an initial access connection request message from a first UE among the one or more UEs; and
    sending the RAR message based at least in part on the second code rate to the first UE,
  wherein the updating one or more parameters to adjust the code rate used for generating the communication messages to the one or more UE, from the first code rate to the second code rate, based at least in part on the success rate, comprises:
    determining the second code rate to be less than the first code rate, in response to determining that the first number of connection attempts is greater than a first connection attempt threshold and that the success rate is less than a first success rate threshold, and updating the one or more parameters to decrease the code rate in response to determining the first code rate is greater than a minimum code rate threshold; or
    determining the second code rate to be greater than the first code rate, in response to determining that the first number of connection attempts is greater than a second connection attempt threshold and the success rate is greater than a second success rate threshold, and updating the one or more parameters to increase the code rate in response to determining the first code rate is less than a maximum code rate threshold.

7. The apparatus of claim 6, wherein the determining the first number of connection attempts over the first duration that are received from the one or more UE comprises:
  receiving one or more first messages from the one or more UE, each first message indicating an initial access connection request by a corresponding UE;
  generating one or more second messages using the first code rate, each second message indicating a random access response to the initial access connection request by the corresponding UE;
  sending the one or more second messages to the one or more UE over the first time duration; and
  determining the first number of connection attempts to be a number of the one or more second messages sent to the one or more UE over the first time duration.

8. The apparatus of claim 6, wherein the determining the success rate for the first number of connection attempts comprises:
  receiving one or more third messages from the one or more UE indicating receipt of one or more second messages sent to the one or more UE over the first time duration, each third message indicating receipt by a corresponding UE in response to a corresponding second message sent to the corresponding UE; and
  determining the success rate for the first number of connection attempts based at least in part on a number of second messages sent over the first time duration and a number of third messages received.

9. The apparatus of claim 8, wherein the one or more second messages are generated using the first code rate, and wherein the success rate is a ratio of the number of third messages received and the number of second messages sent over the first time duration.

10. The apparatus of claim 6, wherein the first message is a random access channel (RACH) message, the second message is a RAR message, and the third message is a radio resource control (RRC) message.

11. A non-transitory computer-readable medium for storing computer readable program code or instructions for carrying out operations, when executed by a processor, for adaptive optimization of a random access response (RAR) message, the operations comprising:
  determining a first number of connection attempts over a first time duration that are received from one or more user equipment (UE);
  determining a success rate for the first number of connection attempts;
  updating one or more parameters to adjust a code rate used for generating communication messages to the one or more UEs, from a first code rate to a second code rate, based at least in part on the success rate;

generating the RAR message using the second code rate, in response to receiving an initial access connection request message from a first UE among the one or more UEs; and sending the RAR message based at least in part on the second code rate to the first UE, wherein the updating one or more parameters to adjust the code rate used for generating the communication messages to the one or more UE, from the first code rate to the second code rate, based at least in part on the success rate, comprises:

determining the second code rate to be less than the first code rate, in response to determining that the first number of connection attempts is greater than a first connection attempt threshold and that the success rate is less than a first success rate threshold, and updating the one or more parameters to decrease the code rate in response to determining the first code rate is greater than a minimum code rate threshold; or determining the second code rate to be greater than the first code rate, in response to determining that the first number of connection attempts is greater than a second connection attempt threshold and the success rate is greater than a second success rate threshold, and updating the one or more parameters to increase the code rate in response to determining the first code rate is less than a maximum code rate threshold.

12. The non-transitory computer-readable medium of claim 11, wherein the determining the first number of connection attempts over the first duration that are received from the one or more UE comprises:

receiving one or more first messages from the one or more UE, each first message indicating an initial access connection request by a corresponding UE;

generating one or more second messages using the first code rate, each second message indicating a random access response to the initial access connection request by the corresponding UE;

sending the one or more second messages to the one or more UE over the first time duration; and determining the first number of connection attempts to be a number of the one or more second messages sent to the one or more UE over the first time duration.

13. The non-transitory computer-readable medium of claim 11, wherein the determining the success rate for the first number of connection attempts comprises:

receiving one or more third messages from the one or more UE indicating receipt of one or more second messages sent to the one or more UE over the first time duration, each third message indicating receipt by a corresponding UE in response to a corresponding second message sent to the corresponding UE; and determining the success rate for the first number of connection attempts based at least in part on a number of second messages sent over the first time duration and a number of third messages received.

14. The non-transitory computer-readable medium of claim 13, wherein the one or more second messages are generated using the first code rate, and wherein the success rate is a ratio of the number of third messages received and the number of second messages sent over the first time duration.

* * * * *